Patented Jan. 1, 1952

2,580,996

UNITED STATES PATENT OFFICE 2,580,996

WAX COMPOSITIONS

John Mann Butler, Dayton, Ohio, assignor to Monsanto Chemical Company, St. Louis, Mo., a corporation of Delaware No Drawing. Application July 16, 1948,
Serial No. 39,202

8 Claims. (Cl. 260—28.5)

This invention relates to wax or wax-containing compositions having improved toughness and relates particularly to compositions which are adapted to be used in connection with the impregnation and coating of fibrous products, such as paper, textiles, leather and wood.

An object of this invention is to improve the physical properties of waxes or compositions containing waxes of various types and proportions. Another object is to provide compositions which are adapted to impregnating paper or paper products, particularly for impregnating paper which is to be used for wrapping or for the forming of objects of paper where some degree of adhesiveness is required.

It has now been discovered that, polystyrene which has been alkylated by reaction with polymeric propylene is in certain proportions completely compatible with hydrocarbon waxes, and the homogeneous blends thereof have unusual and very desirable physical properties; such as improved tensile strength, elongation, hardness, gloss and adhesion to paper, metal, wood and synthetic resins. Suitable waxes are the paraffin waxes, including both the microcrystalline waxes and the lower melting paraffin waxes, and the earth waxes, such as ceresin or ozokerite. The new compositions may be made by mixing from 40 to 99.98 percent by weight of the paraffin wax and from 60 to 0.02 percent of said alkylated polystyrene, but preferred compositions will have 80 or more percent of the wax, the percentages being based on the total wax and alkylated polystyrene in the composition. Various other modifying agents, such as fillers, plasticizers, pigments and adhesives, may be added as desired in the manner conventional in the art of coating compositions.

The polystyrenes used in the practice of this invention are those having molecular weights between 10,000 and 1,000,000, and preferably those between 60,000 and 300,000. The alkylation may be accomplished by reaction of the polystyrene with polymeric propylene in the manner described and claimed in copending application, Serial No. 670,041, filed by John Mann Butler and Joachim Dazzi on May 15, 1946, now abandoned, by which method the alkylation is conducted in the presence of an aluminum chloride catalyst and a nitro compound.

The propylene polymers for use in preparing the alkylated polystyrene used in the practice of this invention may be prepared by polymerizing propylene in the presence of "solid phosphoric acid catalyst" and fractionating the liquid mixture so obtained. The fraction boiling between 55 and 235° C. is useful but the best results are secured by using the fraction boiling between 175° C. and 225° C.

The present compositions may be applied to paper, textiles, or generally any fibrous material by impregnation or coating such as by dipping the material into the molten composition, or in solutions of the composition in suitable solvents. Such application may be made by hand by merely dipping the material to be impregnated or coated into the molten composition or into a solution of the same in a suitable solvent. If desired, application may be made by machine in which continuous fabrics of the material to be treated are drawn through the baths of the compounds herein disclosed, or by calender rolls, heated if desired, which force the solid composition into the interstices of the fibrous composition being impregnated. Application to the surface of papers, felt, cloth, or other fabrics may be accomplished by use of a spreading technique, whereby the thickness of the application is regulated by means of adjustable spreader bars or doctor blades in the manner well known to the art.

Suitable hydrocarbon waxes for blending with alkylated polystyrene in accordance with this invention are the waxes having melting or softening points over 100° F. and preferably those which remain relatively hard and rigid at temperatures up to 120° F. Of particular importance are the microcrystalline paraffin waxes having melting points between 140° F. and 200° F. the low melting paraffins, and the hydrocarbon earth waxes, for example the refined ceresin.

Further details of the practice of this invention are set forth with respect to the following specific examples.

Example 1

A polystyrene having a molecular weight of 70,000 was alkylated by reaction with a mixture of propylene polymers having an average of 12 carbon atoms per molecule and boiling over the range of 175 to 225° C. at atmospheric pressure. Fifteen parts by weight of the alkylated polystyrene so produced was mixed with 85 parts of a microcrystalline paraffin wax having a melting point of 172° F. The blend was made by melting the paraffin and thoroughly mixing the alkylated polystyrene therein by vigorous stirring. Samples of the microcrystalline paraffin wax and samples of the blend were prepared by casting and the tensile strength and elongation were measured using conventional test equipment.

The following results indicate that the incorporation of the alkylated polystyrene in the wax serves to increase both tensile strength and elongation.

|  | Tensile Strength, lbs. per sq. in. | Elongation, percent |
|---|---|---|
| Microcrystalline Paraffin Wax, M. P. 172° F | 190 | 33 |
| 85 parts paraffin (M. P. 172° F.) and 15 parts alkylated polystyrene | 255 | 66 |

Example 2

The procedure of Example 1, was duplicated except that a microcrystalline paraffin wax having a melting point of 180° F. was used. The following test data indicates that substantial improvements in both tensile strength and elongation of the blend was obtained.

|  | Tensile Strength, lbs. per sq. in. | Elongation, percent |
|---|---|---|
| Paraffin Wax (M. P. 180° F.) | 370 | 1 |
| 85 parts paraffin (M. P. 180° F.) and 15 parts alkylated polystyrene | 450 | 10 |

Example 3

The following materials were blended by melting microcrystalline paraffin waxes and stirring in alkylated polystyrene made by the method described in Example 1.

| | Parts by weight |
|---|---|
| Alkylated polystyrene made from propylene trimer | 22.5 |
| Microcrystalline paraffin wax (M. P. 172° F.) | 75 |
| Microcrystalline paraffin wax (M. P. 190–195° F.) | 75 |

This composition was used to coat paper and was found to produce a tough somewhat elastic coating with excellent adhesion.

Example 4

A hard paper coating composition was prepared by blending ten parts of the alkylated polystyrene of Example 1, with ninety parts of the microcrystalline paraffin wax having a melting point of 172° F. The blending was achieved by melting the wax and stirring in the alkylated polystyrene until a homogeneous mixture was formed.

Example 5

Fifty parts by weight of a microcrystalline paraffin wax having a melting point of 172° F. was melted and 30 parts by weight of a polystyrene alkylated by reaction described in Example 1. Thereafter 15 parts by weight of hydrogenated glyceryl abietate and 5 parts of butyl phthalyl butyl glycolate were added and thoroughly blended. This product was used to impregnate paper which was valuable in wrapping cheese due to its ability to resist cracking and crushing, and to withstand the rough handling encountered in shipping operations.

Example 6

A paper with a highly glossy surface, useful as a decorative wrapping material for food packaging was made by coating paper with a blend of the following materials.

| | Parts by weight |
|---|---|
| Alkylated polystyrene (Example 1) | 15 |
| Paraffin wax, M. P. 146–148° C | 34 |
| Terpene resin | 18 |
| Dioctyl phthalate | 5 |
| Pigment | 8 |

Example 7

A coated paper useful in wrapping bread and other food stuffs by reason of its more adhesive nature was prepared by blending the following materials.

| | Parts by weight |
|---|---|
| Microcrystalline wax, M. P. 172° F | 20 |
| Alkylated polystyrene (Example 1) | 8 |
| Paraffin wax, M. P. 146–148° F | 72 |

Example 8

An alkylated polystyrene was prepared by alkylating a polystyrene (molecular weight 125,000) with the propylene polymer and then blended with various proportions of a paraffin wax (M. P. 128/130° F.). The blends were effected by heating the mixture at 125° C. and stirring until a homogeneous composition was obtained, two to three hours being required. The melted blends were then cast into sheets one quarter inch in thickness, and thereafter cut into test specimen by means of a suitable die. The following tabulation shows the tensile strengths measured on a Scott L–5 Rubber Tester.

| Per Cent Alkylated Polystyrene | Tensile, lbs. per sq. inch |
|---|---|
| 0.1 | 233 |
| 0.5 | 277 |
| 1.0 | 276 |
| 3.0 | 270 |
| 5.0 | 296 |
| 10.0 | 298 |

The untreated wax was also measured and the average of several measurements was 133 pounds per square inch.

Example 9

The procedure of Example 8 was repeated except that the alkylated polystyrene was prepared from a polystyrene having a molecular weight of 730,000. The following table sets forth the measured tensile strengths and a control on the wax made under identical conditions.

| Per Cent Alkylated Polystyrene | Tensile, lbs. per sq. inch |
|---|---|
| 0.0 | 139 |
| 0.1 | 209 |
| 0.5 | 237 |
| 1.0 | 250 |
| 3.0 | 273 |
| 10.0 | 293 |

Although the invention has been described with respect to specific embodiments, it is not intended that the details thereof shall be construed as limitations upon the scope of the invention except to the extent incorporated in the following claims.

I claim:
1. A coating composition comprising a hydrocarbon wax and an alkylated polystyrene made by reacting polystyrene with a propylene polymer, said wax being present to the extent of from 40 to 99.98 percent by weight of the total of the wax and alkylated polystyrene.

2. A coating composition comprising a hydrocarbon wax and an alkylated polystyrene made by reacting polystyrene with a propylene polymer boiling between 175° C. and 225° C. at atmospheric pressure, said wax being present to the extent of from 60 to 99.98 percent by weight of the total of the wax and alkylated polystyrene.

3. A coating composition comprising a paraffin wax and an alkylated polystyrene made by reacting polystyrene with a propylene polymer, said wax being present to the extent of from 60 to 99.98 percent by weight of the total of the wax and the alkylated polystyrene.

4. A coating composition comprising a paraffin wax and an alkylated polystyrene made by reacting polystyrene with a propylene polymer boiling between 175° C. and 225° C. at atmospheric pressure, said wax being present to the extent of from 60 to 99.98 percent by weight of the total of the wax and alkylated polystyrene.

5. A coating composition comprising a hydrocarbon wax and an alkylated polystyrene having a molecular weight of 60,000 to 1,000,000, made by reacting polystyrene with a propylene polymer, said wax being present to the extent of from 60 to 99.98 percent by weight of the total of the wax and alkylated polystyrene.

6. A coating composition comprising a hydrocarbon wax and an alkylated polystyrene having a molecular weight of 60,000 to 1,000,000, made by reacting polystyrene with a propylene polymer, boiling between 175° C. and 225° C. at atmospheric pressure, said wax being present to the extent of from 60 to 99.98 percent by weight of the total of the wax and alkylated polystyrene.

7. A coating composition comprising a paraffin wax and an alkylated polystyrene having a molecular weight of 60,000 to 1,000,000, made by reacting polystyrene with a propylene polymer, said wax being present to the extent of from 60 to 99.98 percent by weight of the total of the wax and the alkylated polystyrene.

8. A coating composition comprising a paraffin wax and an alkylated polystyrene having a molecular weight of 60,000 to 1,000,000, made by reacting polystyrene with a propylene polymer, boiling between 175° C. and 225° C. at atmospheric pressure, said wax being present to the extent of from 60 to 99.98 percent by weight of the total of the wax and alkylated polystyrene.

JOHN MANN BUTLER.

REFERENCES CITED

The following references are of record in the file of this patent:

UNITED STATES PATENTS

| Number | Name | Date |
|---|---|---|
| 2,072,120 | Mikeska et al. | Mar. 2, 1937 |